US009048930B2

(12) United States Patent
Dabiri

(10) Patent No.: US 9,048,930 B2
(45) Date of Patent: *Jun. 2, 2015

(54) DETECTION AND ESTIMATION OF NARROWBAND INTERFERENCE BY MATRIX MULTIPLICATION

(71) Applicant: Applied Micro Circuits Corporation, Sunnyvale, CA (US)

(72) Inventor: Dariush Dabiri, San Jose, CA (US)

(73) Assignee: Applied Micro Circuts Corporations, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/854,675

(22) Filed: Apr. 1, 2013

(65) Prior Publication Data

US 2013/0215949 A1 Aug. 22, 2013

Related U.S. Application Data

(63) Continuation of application No. 12/952,164, filed on Nov. 22, 2010, now Pat. No. 8,432,983.

(51) Int. Cl.
*H04B 3/46* (2006.01)
(52) U.S. Cl.
CPC ............. *H04B 3/46* (2013.01); *H04B 17/345* (2015.01)
(58) Field of Classification Search
USPC ......... 375/224, 260, 267, 296, 299, 346, 347, 375/348, 349, 350
See application file for complete search history.

(56) References Cited

U.S. PATENT DOCUMENTS

| 6,122,309 | A | * | 9/2000 | Bergstrom et al. ............ 375/130 |
| 6,219,376 | B1 | * | 4/2001 | Zhodzishsky et al. ........ 375/148 |
| 6,904,443 | B2 | | 6/2005 | White |
| 6,976,044 | B1 | | 12/2005 | Kilani |
| 7,003,094 | B2 | | 2/2006 | Foscher et al. |
| 7,741,921 | B2 | | 6/2010 | Ismailov |
| 2003/0165205 | A1 | | 9/2003 | Chu et al. |
| 2004/0218695 | A1 | | 11/2004 | Koga et al. |
| 2007/0009011 | A1 | | 1/2007 | Coulson |
| 2008/0112525 | A1 | | 5/2008 | Do et al. |
| 2008/0267392 | A1 | | 10/2008 | Raheja et al. |
| 2009/0061808 | A1 | | 3/2009 | Higgins |
| 2009/0238102 | A1 | | 9/2009 | Dabiri |
| 2009/0252234 | A1 | | 10/2009 | Samdani et al. |
| 2010/0118849 | A1 | | 5/2010 | Kimura |

(Continued)

OTHER PUBLICATIONS

U.S. Appl. No. 12/952,150, pp. 52.

(Continued)

*Primary Examiner* — Kabir A Timory

(57) ABSTRACT

One or more processing units are programmed to select from among M tones in a frequency domain representation of a signal, a set of tones including at least a strongest tone (relative to background noise) and a tone adjacent thereto. From among M complex numbers in the frequency domain representation of the signal, a set of complex numbers are identified and denoted as a vector Z, corresponding to the selected set of tones. Vector Z is then multiplied with each of M columns of a matrix G which is predetermined to identify a sub-resolution maxima in Z. The M products that result from the vector multiplication of Z and G are used to determine and store in memory at least one or both of: (A) a flag indicating presence or absence of narrowband interference in the signal; and (B) an estimate of a frequency of the narrowband interference.

20 Claims, 9 Drawing Sheets

(56) References Cited

U.S. PATENT DOCUMENTS

2011/0116536 A1    5/2011    Tsuie
2011/0200126 A1    8/2011    Bontu et al.

OTHER PUBLICATIONS

U.S. Appl. No. 12/952,154, pp. 49.
U.S. Appl. No. 12/952,172, pp. 28.
U.S. Appl. No. 12/952,178, pp. 40.
U.S. Appl. No. 12/952,184, pp. 34.
U.S. Appl. No. 12/952,193, pp. 35.
Ungerboeck, G. "10GBASE-T Coding and Modulation: 128-DSQ+LPDC", IEEE P802.3an Task Force, Ottawa, Sep. 29-Oct. 1, 2004, pp. 15.
"802.3an—2006 IEEE Standard for Information Technology—Telecommunications and Information Exchange Between Systems—Local and Metropolitan Area Networks—Specific Requirements, Part 3: Carrier Sense Multiple Access With Collision Detection (CSMA/CD) Access Method and Physical Layer Specifications", Sep. 2006, pp. 167.

Stolle, R. "Electromagnetic Coupling of Twisted Pair Cables", published in IEEE Journal on Selected Areas in Communications, vol. 20, No. 5, Jun. 2002, pp. 883-891.
Nehorai, A. et al., "Adaptive Comb Filtering for Harmonic Signal Enhancement", published in IEEE Transactions on Acoustics, Speech, and Signal Processing, vol. ASSP-34, No. 5, Oct. 1986, pp. 1124-1138.
Nehorai, A. "A Minimal Parameter Adaptive Notch Filter With Constrained Poles and Zeros", published in IEEE Transactions on Acoustics, Speech, and Signal Processing, vol. ASSP-33, No. 4, Aug. 1985, pp. 983-996.
Stoica, P. et al. "Performance Analysis of an Adaptive Notch Filter with Constrained Poles and Zeros", published in IEEE Transactions on Acoustics, Speech, and Signal Processing, vol. 36, No. 6, Jun. 1988, pp. 911-991.
MacLeod, M.D. "Fast Nearly ML Estimation of the Parameters of Real or Complex Single Tones or Resolved Multiple Tones", published in IEEE Transactions on Signal Processing, vol. 46, No. 1, Jan. 1998, pp. 141-148.

* cited by examiner

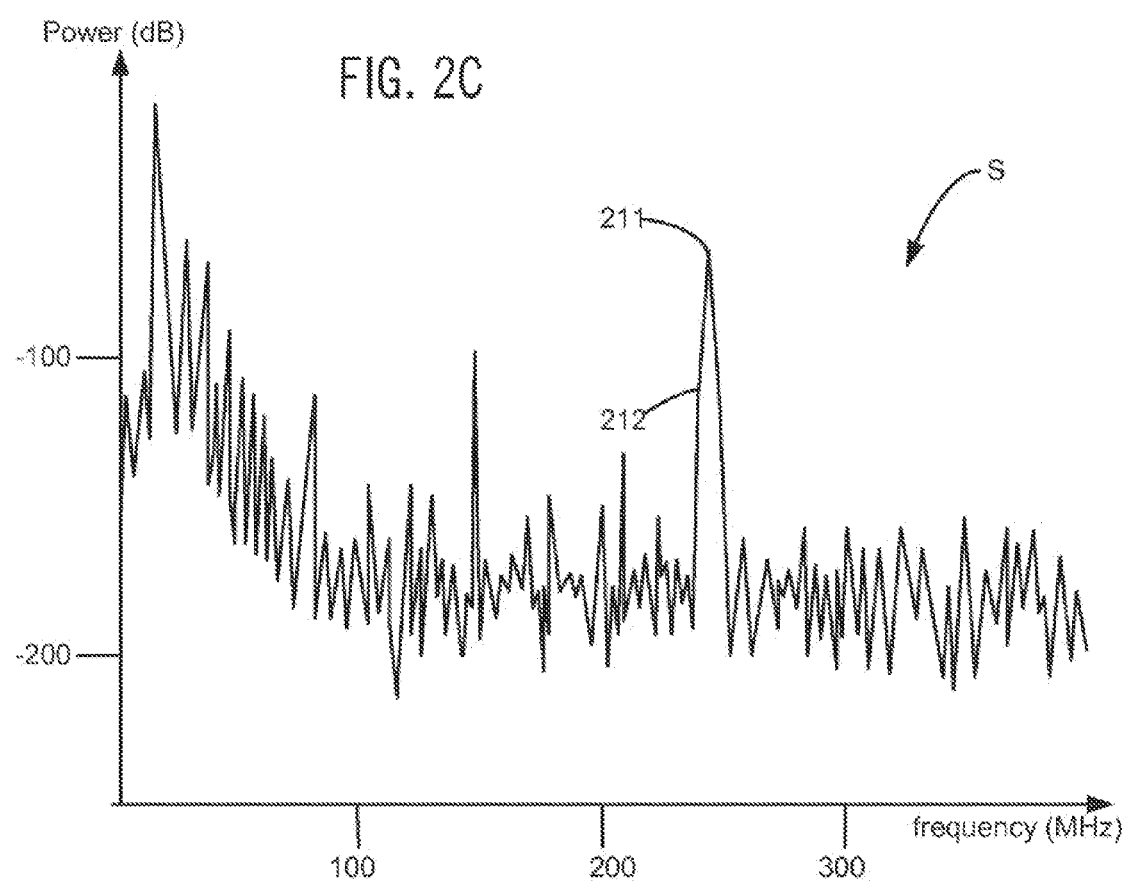

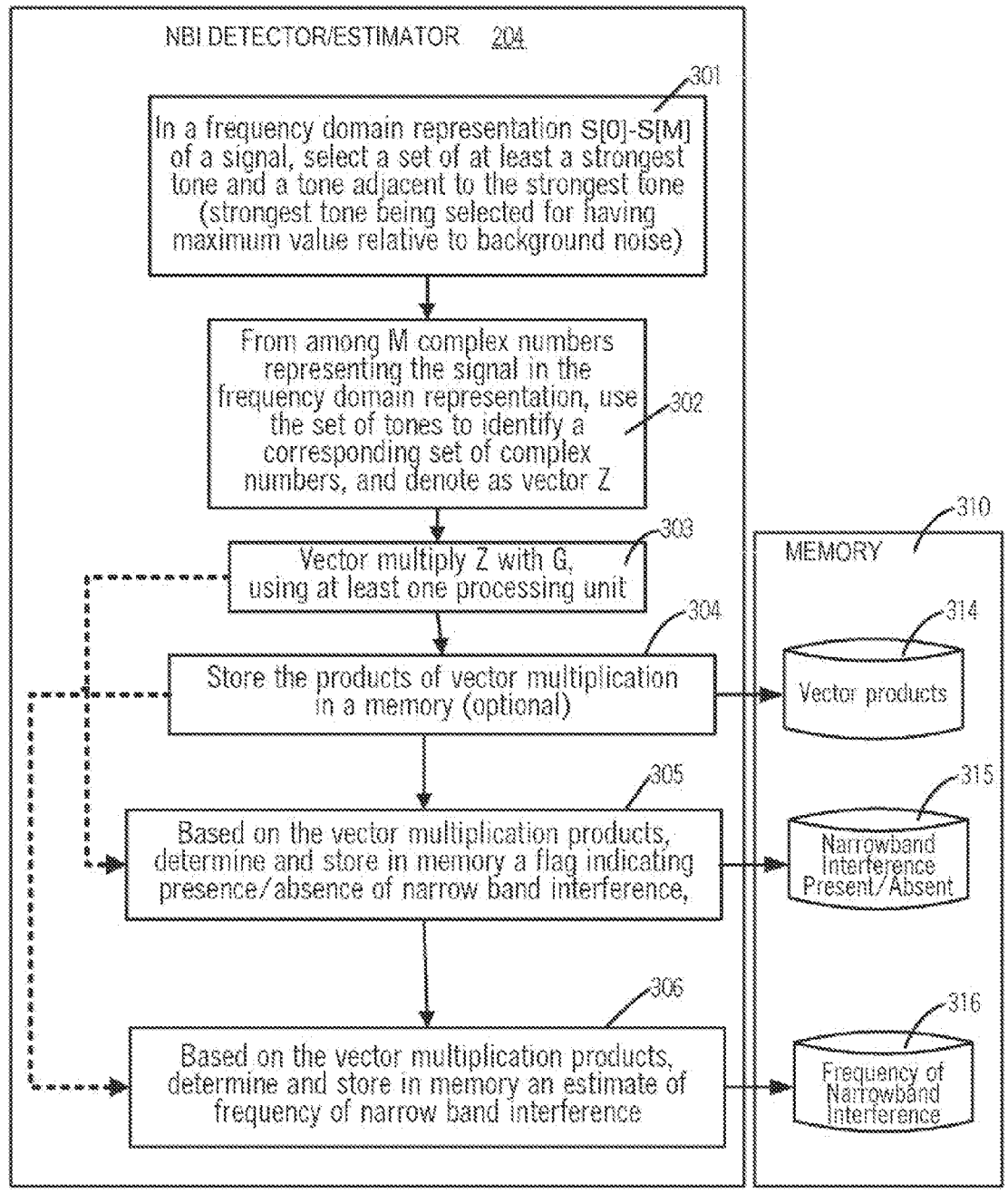

DETECTION AND ESTIMATION OF NARROWBAND INTERFERENCE BY MATRIX MULTIPLICATION

CROSS-REFERENCES TO RELATED APPLICATIONS

This application is a Continuation Application of and claims priority to U.S. patent application Ser. No. 12/952,164, filed on Nov. 22, 2010, titled "DETECTION AND ESTIMATION OF NARROWBAND INTERFERENCE BY MATRIX MULTIPLICATION," by Dariush Dabiri, which is herein incorporated by reference, which is related to and incorporates by reference herein in their entirety, the following patent applications that are co-owned and concurrently filed herewith:

(1) U.S. patent application, entitled "Stabilized Digital Quadrature Oscillator" by Dariush Dabiri et al., Ser. No. 12/952,154;

(2) U.S. patent application, entitled "Narrowband Interference Cancellation Method and Circuit" by Dariush Dabiri, Ser. No. 12/952,150;

(3) U.S. patent application, entitled "Confirmation of Presence of Narrowband Interference by Harmonic Analysis" by Dariush Dabiri et al., Ser. No. 12/952,182;

(4) U.S. patent application, entitle "Adaptive Spectral Enhancement and Harmonic Separation" by Dariush Dabiri et al., Ser. No. 12/952,178;

(5) U.S. patent application, entitled "Adaptive Narrowband Interference Prediction Circuit and Method" by Dariush Dabiri et al., Ser. No. 12/952,184; and (6) U.S. patent application, entitled "Multi-Input IIR Filter with Error Feedback" by Maged F. Barsoum, et al. Ser. No. 12/952,193.

BACKGROUND

In a local area network, a PHY device 12 in a computer 10 (FIG. 1A) may be connected to another PHY device 22 in an Ethernet Switch 20 by use of a cable 32. Cable 32 typically includes four twisted-pair copper conductors 32A-32D (which may be shielded or unshielded) that carry analog signals between four transceivers 12A-12D in PHY device 12 (that in turn is coupled to MAC device 11) and four transceivers 22A-22D in PHY device 22 (that in turn is coupled to MAC device 21). Each of transceivers 12A-12D typically includes a transmit data path and a receive data path in an integrated circuit (IC) die that forms PHY device 12. The transmit data path typically includes an FEC encoder, transmit circuitry, a digital to analog converter, an analog filter, and a line driver, illustrated unlabeled in FIG. 1A. Similarly, the receive data path typically includes corresponding components in a reverse order, e.g. a receive amplifier, an analog filter, an analog to digital converter, receive circuitry and an FEC decoder (also see FIG. 1A).

A signal received from cable 32 by any of transceivers 22A-22D is typically weak, and any degradation affects the bit error rate (BER). Degradation of the signal during transmission across cable 32 occurs for a number of known reasons, such as echo due to reflections in cable 32, near end cross talk (NEXT) and far end cross talk (FEXT) due to the adjacency of conductors in cable 32, attenuation caused by length of cable 32, etc. Such reasons for degradation are internal to a communication channel that is formed between transceivers 12A-12D, 22A-22D by cable 32. Such internally-originated noise depends strictly on the physical characteristics of cable 32 and its connections to transceivers 22A-22D. Several prior art techniques have been developed, to suppress or cancel such internally-originated noise.

The signal transmitted through cable 32 (FIG. 1A) is occasionally further degraded by noise that originates externally ("externally-generated noise"). For example, coupling of electromagnetic energy radiated by a wireless device 31, such as a walkie-talkie typically occurs in cable 32, resulting in noise therein due to electromagnetic interference (EMI). The amount of such EMI noise that gets injected into a signal in cable 32 increases as the distance reduces between wireless device 31 and cable 32. When wireless device 31 is sufficiently close, the EMI noise picked up by cable 32 can so severely corrupt a signal carried therein that a link drop occurs. The amount of EMI noise that is picked up by a signal travelling through cable 32 depends on various characteristics of cable 32, such as shielding and grounding. When cable 32 is used to transfer data at a high rate, such as 10 Gbps, the current inventor believes that prior art shielding and become insufficient e.g. because electromagnetic fields penetrate through such shielding and induce currents in cable 32.

Some prior art methods may remove EMI from a signal that is received by any of transceivers 22A-22D by applying spectral analysis directly to the received signal. For further information on spectral analysis of a signal, see the following books: (1) Introduction to Spectral Analysis, by P. Stoica and R. Moses. Prentice Hall, N.J., 1997 and (2) Modern Spectral Estimation: Theory and Practice, by S. M. Kay, Prentice Hall, N.J. 1988. Also see the article entitled "Electromagnetic Coupling of Twisted Pair Cables" by Reinhard Stolle, published in IEEE JOURNAL ON SELECTED AREAS IN COMMUNICATIONS, VOL. 20, NO. 5, JUNE 2002, which is incorporated by reference herein in its entirety. This article provides a theoretical background and supplies simple approximation formulae for prediction of EMI.

To detect and generate a reliable estimate of EMI, several prior art methods of the type described in the preceding paragraph above, require collection of a large amount of data because the interference signal is embedded in the received signal. Depending on the method, the time required to collect such data can become so large as to result in a link drop between the transmitter and the receiver. Hence, the current inventor believes there is a need for detection and estimation of narrow band interference (EMI/RFI), as discussed below.

SUMMARY

One or more processing units are programmed in accordance with the invention to select from among M tones (e.g. 512 tones) in a frequency domain representation of an input signal (e.g. output by a front end processing circuit after receipt via a twisted pair cable), a set identifying two or more tones (and therefore their frequencies) of a narrowband interference including at least a strongest tone and a tone adjacent thereto. The strongest tone is identified for being at a maximum value across all M tones relative to background noise.

The one or more processing units then identify from among M complex numbers in the frequency domain representation, a set of complex numbers (denoted as a vector Z) that correspond to the selected set of tones. Vector Z is then multiplied with each of the columns of a matrix G (e.g. 2L in number, with L being 8) that is predetermined. All elements in matrix G are predetermined, i.e. G is setup ahead of time, designed to identify a sub-resolution maxima in vector Z. Based on M products that result from vector multiplication of Z and G, one or more processing units determine and store in a computer memory coupled thereto, at least one of: (A) a flag indicating presence or absence of narrow band interference in the input signal; and (B) an estimate of a frequency of narrow band interference in the input signal.

BRIEF DESCRIPTION OF THE FIGURES

FIGS. 2B and 2C illustrate, in graphs, frequency domain representation of input signal 299 of FIG. 2A in the respective two modes noted above in reference to FIG. 2A.

FIG. 3 illustrates, in a flow chart, a method performed by NBI detector/estimator 204 in some embodiments of the invention.

DETAILED DESCRIPTION

A remote signal 104 sent by a transmitter is typically received at a receiver as a received signal that includes noise 103, in addition to the remote signal 104. The noise in the received signal depends on various characteristics of the transmission medium as well as external interference. Detection and estimation of narrow band interference (NBI) in accordance with the invention is implemented in some embodiments based on the assumption that the frequency content of the NBI is identifiable from background noise.

In order to make NBI easily identifiable in accordance with the invention, a received signal is initially processed by a Front End Processing Circuit to cancel certain types of noise, such as echo, FEXT and NEXT, e.g. as described in a US Patent Application, with Dariush Dabiri as the first-named inventor, that is concurrently filed herewith, and co-owned as follows:

(1) "Narrowband Interference Cancellation Method and Circuit", Ser. No. 12/952,150.

The just-described patent application is hereby incorporated by reference herein, in its entirety.

Figure 1A:
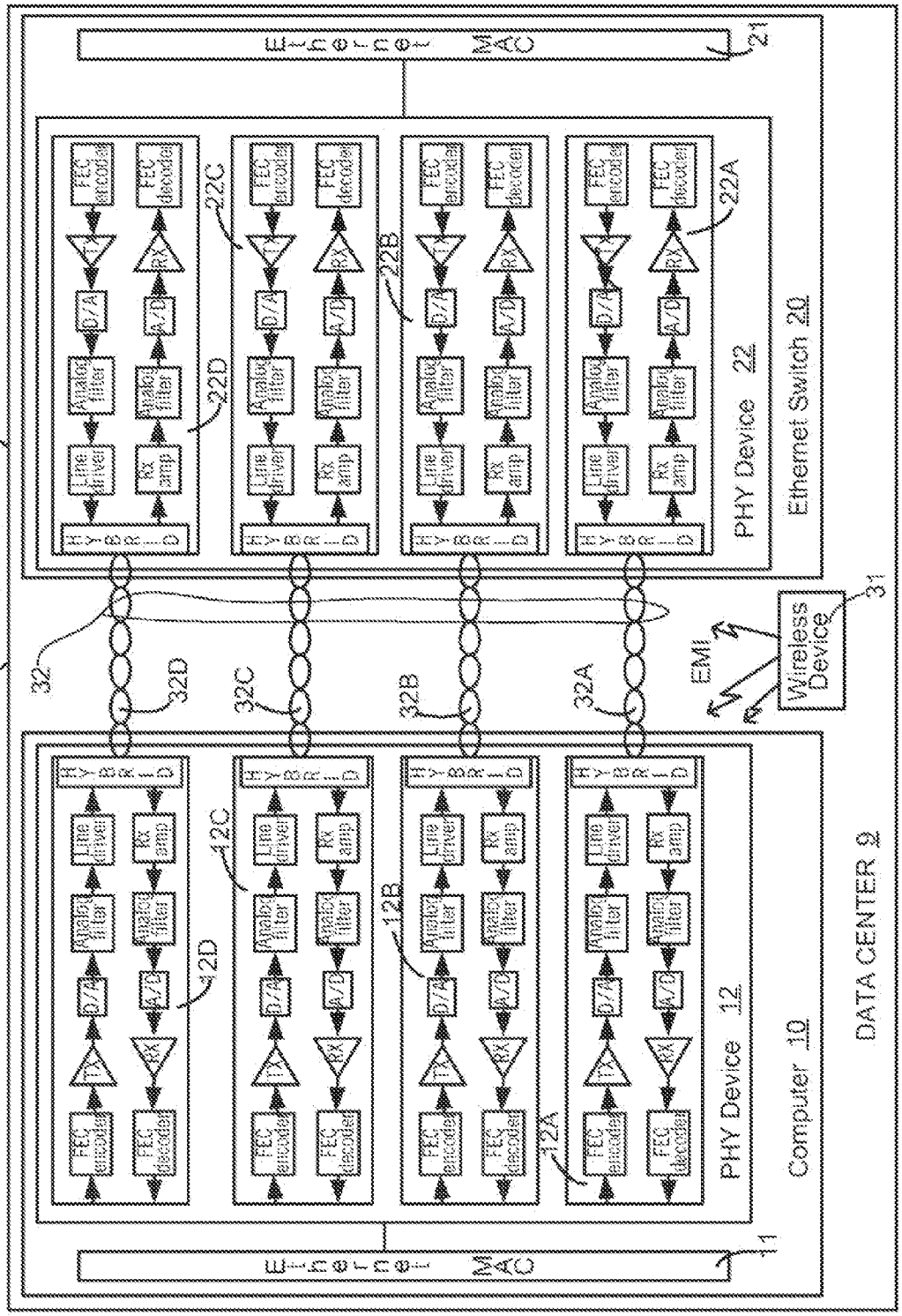
FIG. 1A illustrates, in a high level block diagram, a prior art data center 9 having a computer 10 and an Ethernet switch 20 interconnected by a cable 32, wherein cable 32 experiences electromagnetic interference (EMI) on operation of a wireless device 31.
Figure 1B:
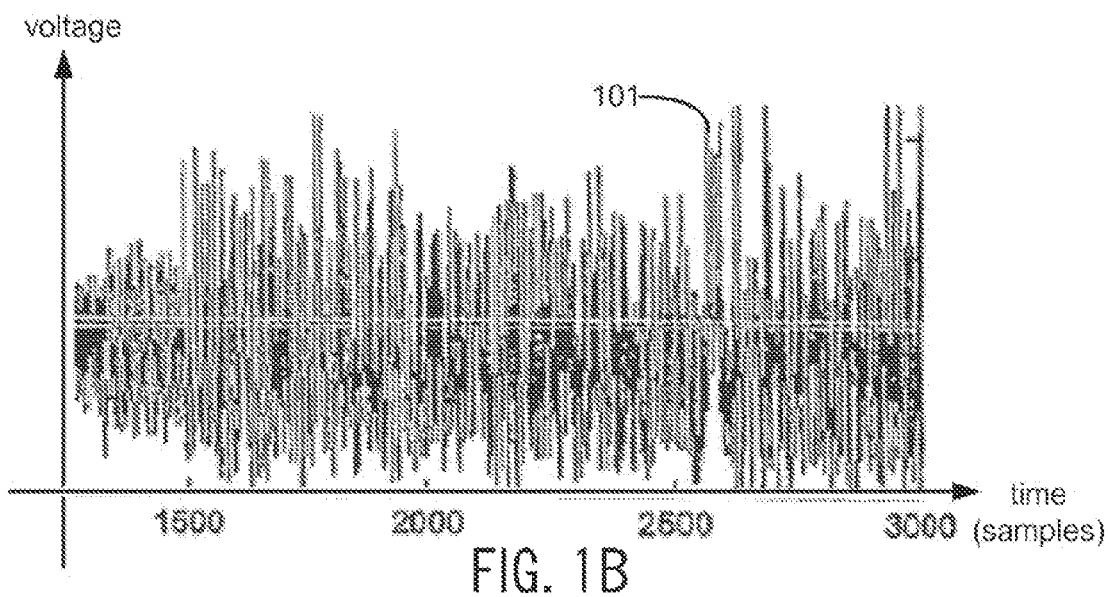
FIG. 1B illustrates, a time domain representation of a signal 101 that is extracted for noise cancellation in some embodiments of the invention, from a signal that is received from a remote transmitter.
Figure 1C:
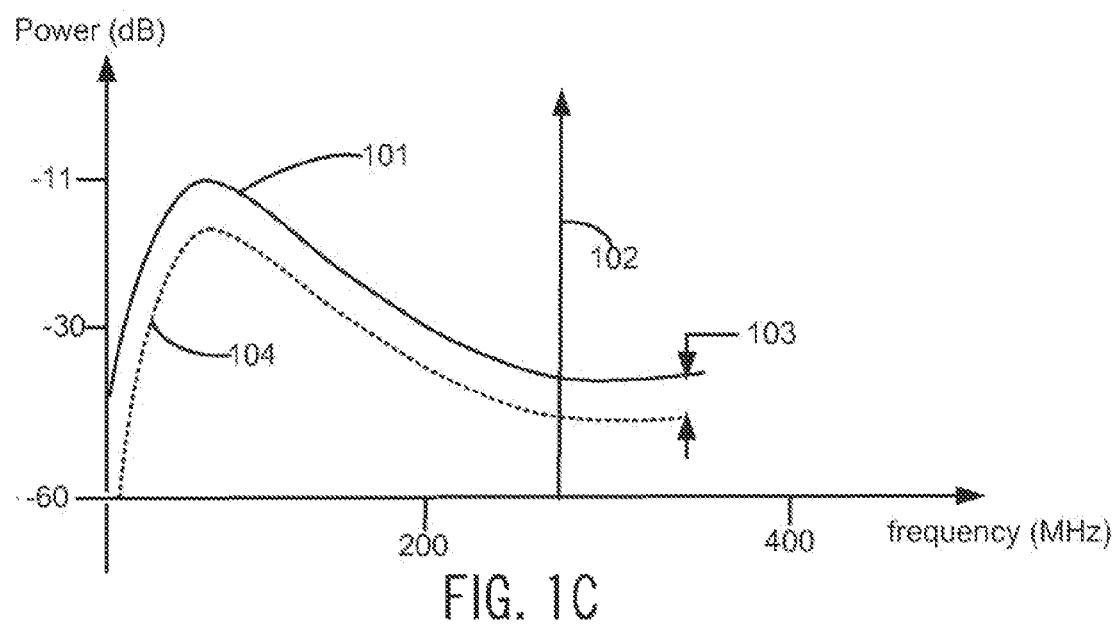
FIG. 1C illustrates a frequency domain representation of signal 101 of FIG. 1B showing noise 103 in addition to signal 104 transmitted by the remote transmitter.

In a signal 101 (shown in the time domain in FIG. 1B) generated by such a Front End Processing Circuit, when narrowband interference (NBI) is present, it may appears as one or more peaks in the frequency domain, e.g. see peak 102 illustrated in FIG. 1C. Accordingly, in several aspects of the invention, a slicer 201 (FIG. 2A) receives the signal 101 and generates a decision signal on bus 2010 (FIG. 2A) that is representative of remote signal 104 (FIG. 1C), in the normal manner. Slicer 201 can be implemented in any manner well known in the art, e.g. as described in a book entitled "Digital Communication" by John R Barry, Edward A. Lee, and David G. Messerschmitt, published in 2004 by Kluwer Academic Publishers. In one illustrative example, slicer 201 is implemented by a processing unit that is coupled to an Ethernet transceiver of the type illustrated in FIG. 1 of US Patent Publication 2009/0238102 entitled "Generating An Estimated Non-Linear Echo Signal", incorporated by reference herein in its entirety.

In several embodiments, an estimate of remote signal 104 as generated by slicer 201 on bus 2010 is supplied to a switch 202 that operates a subtractor 203. Subtractor 203 in turn supplies one of two signals to NBI detector/estimator 204 as the input signal 299: (1) in mode 1, input signal 299 includes (a) noise, (b) NBI and (c) error in estimation of the remote signal as illustrated in FIG. 2B and (2) in mode 0, input signal 299 includes (a) noise, (b) NBI, (c) error in estimation and (d) remote signal as illustrated in FIG. 2C. In both modes, NBI detector/estimator 204 performs the acts 301-306 illustrated in FIG. 3 after transforming its input signal 299 into the frequency domain, as follows.

Figure 2A:
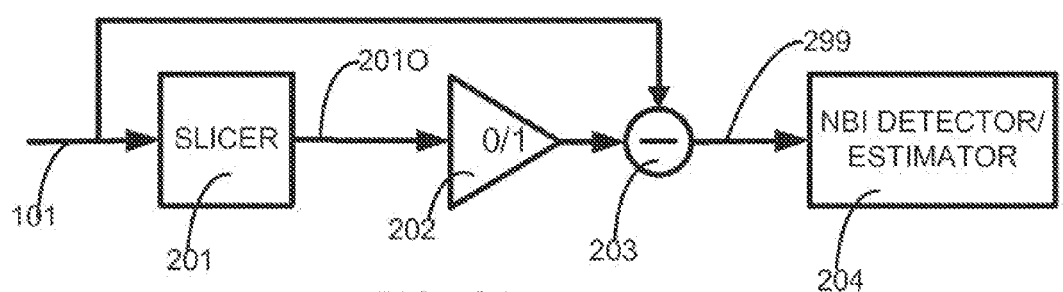
FIG. 2A illustrates, in a block diagram, hardware circuitry that processes extracted signal 101 before input as signal 299 to an NBI detector/estimator 204, in accordance with the invention.
Figure 2B:
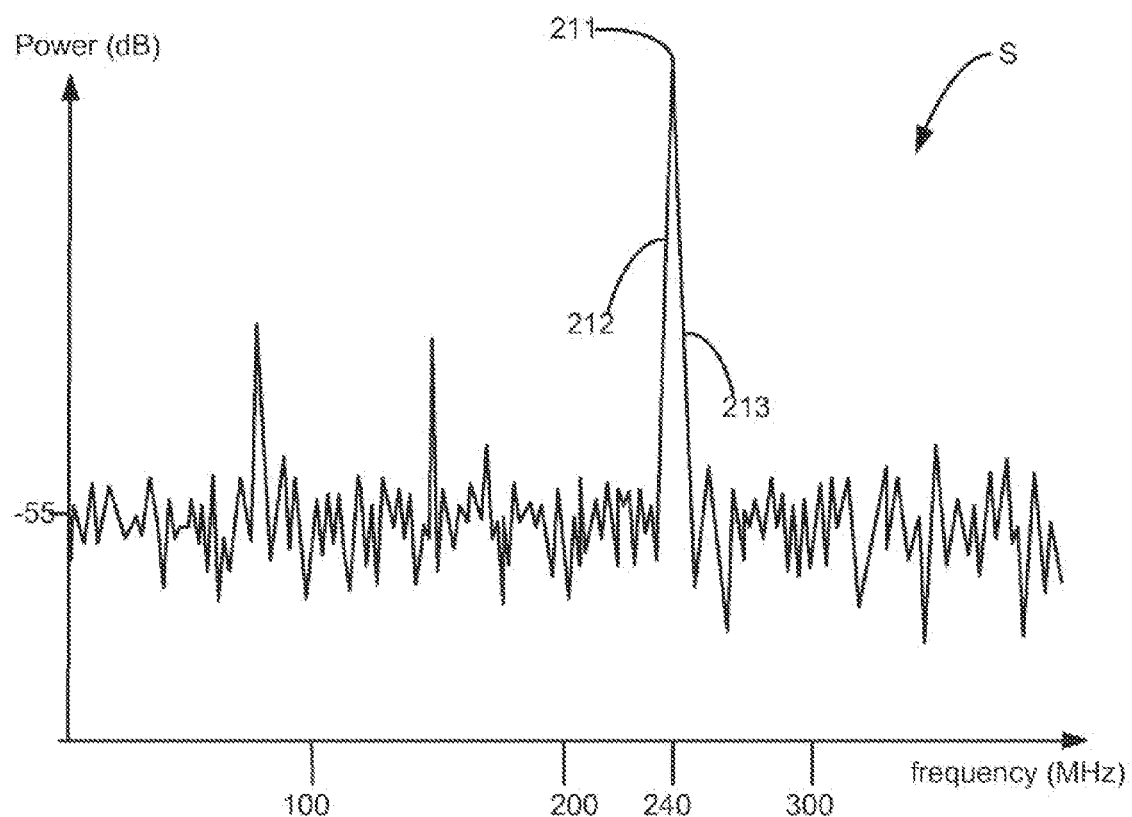

Specifically, in act 301, NBI detector/estimator 204 selects, from among M tones in a frequency domain representation S[0]-S[M−1] of input signal 299 (FIG. 2A), a strongest tone 211 (FIGS. 2B, 2C). In act 301, NBI detector/estimator 204 also selects at least one additional tone 212 that is located adjacent to strongest tone 211, for use in estimating a sub-resolution frequency at which another tone stronger than the selected tones occurs. Estimating a sub-resolution frequency as described herein reduces quantization noise that arises from binning of input signal 299 into a finite number of discrete values and transformation of the discrete values into M discrete frequencies. In some embodiments, the number of samples of input signal 299 in the time domain (e.g. represented as a first set of complex numbers) is identical to the number of tones M in the frequency domain representation (e.g. a second set of complex numbers). In several such embodiments, transformation from the time domain to the frequency domain is done by a fast fourier transform or FFT although alternative embodiments may use any other technique that computes a discrete fourier transform or DFT using M discrete samples of input signal 299.

After a frequency domain representation S[0]-S[M−1] is obtained from the M discrete samples of input signal 299, NBI detector/estimator 204 of some embodiments selects a strongest tone 211 from among the M tones, for having a maximum value (e.g. at a frequency $k_{max}$) relative to background noise. The background noise is everything in a received signal other than a remote signal transmitted on the twisted pair cable and narrowband interference in the form of EMI that is picked up by the twisted pair cable due to coupling with a wireless source. In the example illustrated in FIG. 26, background noise includes white noise (which remains relatively constant e.g. varies no more than 10%) across the frequency spectrum (for example at −55 dB) as well as non-white noise. In the example of FIG. 2B, the strongest tone 211 occurs at frequency $k_{max}$=240 MHz. However, even in situations where background noise is frequency dependent as illustrated in FIG. 2C, NBI detector/estimator 204 identifies strongest tone 211 to be at frequency $k_{max}$=240 MHz, e.g. by use of frequency-specific thresholds. The specific manner in which strongest tone 211 is selected by NBI detector/estimator 204 from frequency domain representation S[0]-S[M−1] is different in different embodiments.

As noted above, in addition to selection of strongest tone 211 at frequency $k_{max}$, NBI detector/estimator 204 also selects at least one tone that is located immediately adjacent to frequency $k_{max}$ of strongest tone 211 in the ordered sequence of M tones in the vector S[0]-S[M−1], sequenced from the lowest frequency to the highest frequency, as follows: $0 \le k_{max-1} < k_{max} < k_{max+1} \le M-1$. Depending on the embodiment, either or both of the two frequencies namely $k_{max-1}$ and frequency $k_{max+1}$ which are adjacent to strongest frequency $k_{max}$ may be selected in act 301. In one specific illustrative embodiment, a tone 212 at frequency $k_{max-1}$ is selected, for being stronger than tone 213 at frequency $k_{max+1}$. In another illustrative embodiment, exactly three tones are selected in act 301, and NBI detector/estimator 204 identifies the three frequencies $k_{max-1}$ and $k_{max}$ and $k_{max+1}$ as a selected set of tones.

Next, in act 302, from among M complex numbers (such as Fourier transform values) in the vector S[0]-S[M−1] representing the input signal in the frequency domain. NBI detector/estimator 204 uses the set of tones selected in act 301 to identify a corresponding set of complex numbers, and denotes them as vector Z. Depending on the embodiment, vector Z may have two elements (i.e. two complex numbers) or three elements (i.e. three complex numbers) or four elements (i.e. four complex numbers) or five elements (i.e. five complex numbers) or even more than five elements (and therefore even more than five complex numbers). The specific number of elements of vector Z depends on the resolution and accuracy of a curve fit to be done in each embodiment as discussed next, to find a sub-resolution frequency at which the strongest tone occurs in the frequency domain representation S[0]-S[M−1].

Next, in act 303. NBI detector/estimator 204 multiplies vector Z with a predetermined matrix G. Matrix G is designed ahead of time, to identify a sub-resolution maxima in vector Z. Specifically, matrix G in accordance with the invention is stored in computer memory, and readily available to NBI detector/estimator 204 in act 303. Matrix G has as many rows as vector Z and matrix G has 2L columns. The number of elements in vector Z and the number of columns 2L of matrix G are both predetermined for each embodiment, based on engineering tradeoffs between preciseness in identifying the location of a maxima independent of quantization into M tones, and the amount of hardware needed to perform the vector multiplication and use (e.g. compare) the 2L products of vector multiplication. In one illustrative embodiment, the value of 2L is selected to be 16 (and hence L is 8), although other embodiments use 8 as the value of 2L and still other embodiments use 32 as the value of 2L.

The current inventor believes that multiplication of vector Z with columns of matrix G to perform curve fitting as described in the preceding paragraph above is faster and requires less hardware than all prior art techniques known to the current inventor, for detection and estimation of narrow band interference (such as EMI/RFI). Therefore, vector multiplication is performed in many embodiments of the invention, for detection and estimation of narrow band interference (e.g. EMI/RFI). Note, however, that vector multiplication in accordance with the invention may be implemented differently in different embodiments. For example, in some embodiments, vector multiplication is implemented by a processor performing a table lookup, as discussed in reference to FIG. 6B below.

In some embodiments, at the end of act 303, the 2L products of vector multiplication are stored in a memory 314 as per act 304, although in alternative embodiments the 2L vector products are not stored to memory and instead they are directly processed further. For example, in the alternative embodiments, the 2L vector products resulting from act 303 are directly supplied to a selector which instantaneously selects one of the 2L vector products based on a predetermined criterion. An identifier m of the selected vector product is stored in memory 310 and/or used to detect/identify narrowband interference.

Hence, one or more of the 2L products of vector multiplication and/or a position therein of a selected vector product is/are used by NBI detector/estimator 204 (with or without storage in a memory) to do either or both of the following: (1) as per act 305, determine and store in memory 315, a flag indicating presence/absence of narrowband interference and (2) as per act 306, compute and store in memory 316, a sub-resolution estimate of frequency (finer than the resolution into M frequencies) of narrowband interference. When performing act 305, NBI detector/estimator 204 functions strictly as an NBI detector, i.e. not as an NBI estimator. Moreover, when performing act 306, NBI detector/estimator 204 functions strictly as an NBI estimator, i.e. not as an NBI detector.

As will be readily apparent to the skilled artisan, some embodiments may perform only act 305 as described herein, but not perform act 306 e.g. by using any NBI estimator well known in the prior art. Moreover, other embodiments may perform only act 306 as described herein, but not perform act 305 e.g. by using any NBI detector well known in the prior art. Certain embodiments perform both acts 305 and 306 and therefore NBI detector/estimator 204 functions as both: an NBI estimator and an NBI detector.

Different embodiments apply different techniques to the 2L vector products at the end of act 303, to determine the presence or absence of narrowband interference in the input signal 299 (FIG. 2A). In some embodiments the predetermined criterion is to find a maximum among the vector products, and if that maximum is greater than a predetermined threshold, then NBI detector/estimator 204 sets the flag in memory 315, to indicate presence of narrowband interference. In certain embodiments the predetermined criterion is to check if any one of the vector products is greater than another predetermined threshold, then NBI detector/estimator 204 sets the flag in memory 315, to indicate presence of narrowband interference.

Moreover, different techniques may also be applied to the vector products at the end of act 303, to determine the frequency of narrowband interference in input signal 299, depending on the embodiment. Some embodiments find a maximum among the vector products, and use a position m of this maximum in the sequence of 2L vector products (generated by act 303) to compute the frequency. For example, in several embodiments that identify a set of three complex numbers as vector Z, the following formula is used: $k_{max} + \frac{1}{2}(-1+m/L)$ to calculate the frequency which is then stored in memory 316. However, other embodiments use other formulae, e.g. in certain embodiments that identify a set of only two complex numbers based on the two adjacent frequencies namely $k_{max-1}$ and frequency $k_{max}$, as vector Z, the following formula is used: $k_{max} - (m/2L)$. Accordingly, a specific formula that is used in act 306 for each embodiment is readily apparent to the skilled artisan in view of this detailed description.

In some embodiments, one or more of memories 314, 315, and 315 are implemented as latches and/or flip-flops coupled to NBI detector/estimator 204. Hence, one or more of memories 314, 315, and 315 may be implemented as portions of a memory 310 built with NBI detector/estimator 204 into a single IC chip. However, depending on the embodiment, memory 310 may be implemented as either volatile memory (such as a dynamic random access memory or DRAM) or non-volatile memory (such as a static random access memory or SRAM). In several embodiments, one or more of memories 314, 315, and 315 are implemented on a separate memory chip 310 that is electrically coupled to one or more processor(s), such as microprocessors or electrically coupled to hardwired state machines and custom circuitry, to perform one or more of acts of FIG. 3, to implement NBI detector/estimator 204. Hence, several such embodiments will be readily apparent to the skilled artisan, in view of this detailed description.

In some embodiments, the strongest tone is identified in act 301 by NBI detector/estimator 204 finding a frequency $k_{max}$ at which $T^{-1}[k]*S[k]$ is maximized, wherein $T[k]$ is the $k^{th}$ element in the vector $T^{-1}$ which has a single row of M elements, proportional to power spectrum of background noise, and wherein $S[k]$ is the $k^{th}$ element in the vector $S[0]$-$S[M-1]$ (i.e. at frequency k). In several such embodiments, the vector T and its inverse $T^{-1}$ are computed ahead of time, e.g. in a laboratory in the absence of EMI. The values of the elements in vector T are chosen in some embodiments by trial and error, so as to screen out false positives in detecting the strongest tone. Thereafter the vector $T^{-1}$ (a row of M elements) is kept in memory 310 for ready use by NBI detector/estimator 204 in multiplying with the vector S (a row of M elements) of complex numbers in the frequency domain representation of input signal 299. In several such embodiments, an element-wise vector multiplication $T^{-1}[k]*S[k]$ yields products, from among which a single frequency $k_{max}$ is selected, at which a maximum occurs.

A maximum among products $T^{-1}[i]*S[i]$, such as those described in the immediately preceding paragraph, as well as a maximum among the M products at the end of act 303 can be determined by different maxima identification techniques known to be applicable to complex numbers, depending on the embodiment. For example, a first type of embodiments compare absolute values of complex numbers for use in finding the maximum, while a second type of embodiments compare the sum of squares of the complex numbers for use in finding the maximum. For example, if the complex number is $x+jy$ where j is an imaginary number (square root of $-1$), then the second type of embodiments compute a function A of these two parameters (x, y) such as the function $A=x^2+y^2$ (or an approximation thereof) and use this value for finding a position m of the maximum (e.g. by sorting all such values), while the first type embodiments compute as function A the square-root of the just-described $x^2+y^2$ i.e. the absolute value, also called magnitude (or an approximation thereof) and use the absolute value in finding the position m of the maximum. Hence, several such types of embodiments will be readily apparent to the skilled artisan, in view of this detailed description. One such approximation is described in Subsection B below and is incorporated by reference herein in its entirety.

Figure 4A:
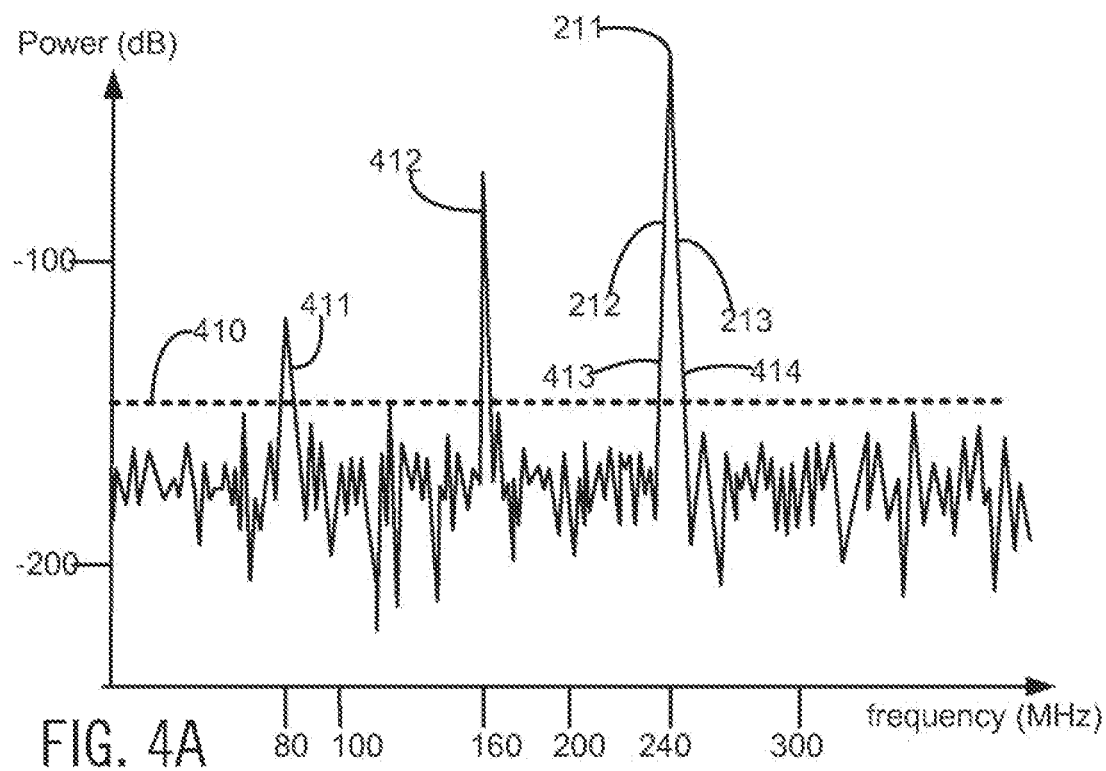
FIGS. 4A and 4B illustrate, in graphs, selection of a set of tones based on a group of candidate tones identified in the respective two modes noted above in reference to FIG. 2A.
Figure 4B:
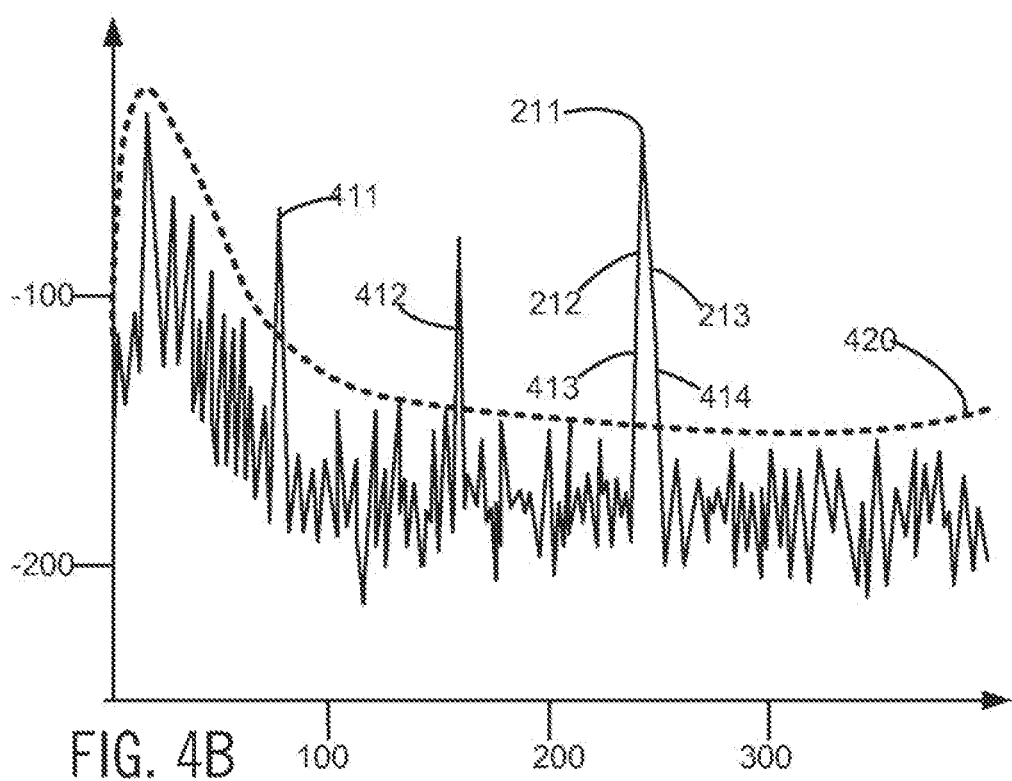
Figure 5:
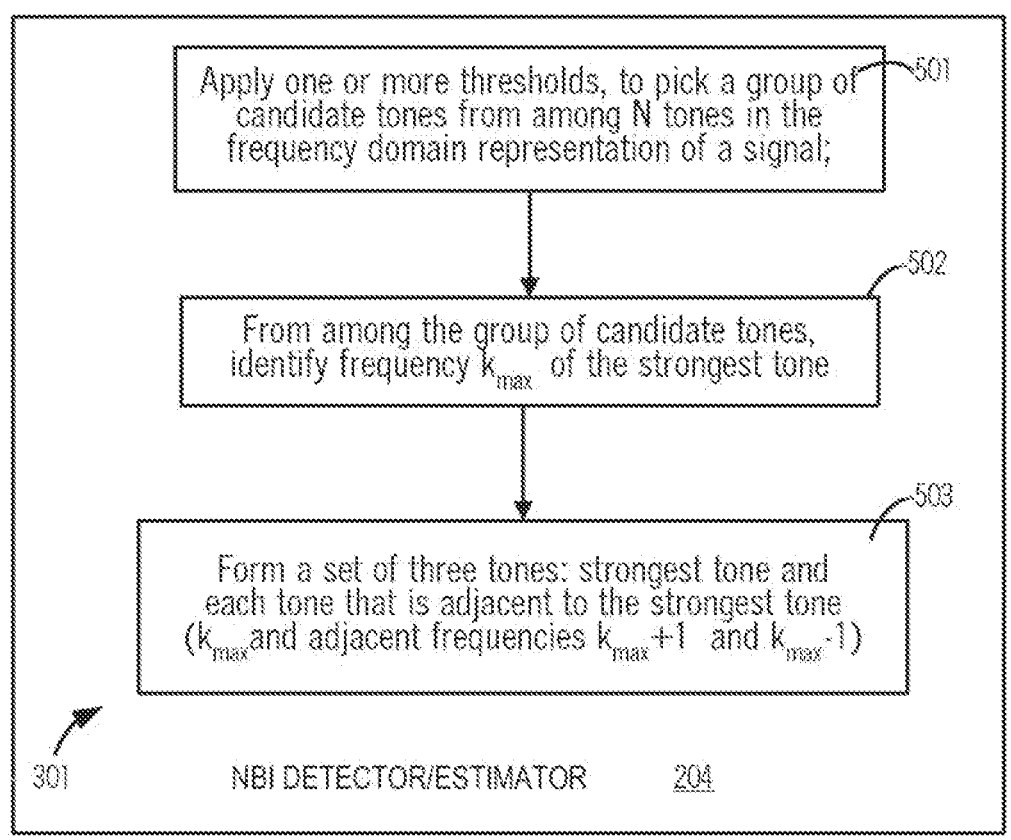
FIG. 5 illustrates, in a flow chart, a method performed by NBI detector/estimator 204, in certain embodiments of the invention.

In some embodiments, a group of candidate tones are first selected from among M tones in the frequency domain representation $S[0]$-$S[M-1]$, by use of a threshold 410 as illustrated in FIG. 4A. Specifically, NBI detector/estimator 204 of one illustrative embodiment compares the power of each of the M tones to a threshold 410 (e.g. predetermined based on background noise), to identify tones 411-414 and 211-213 which are then designated as candidate tones (see act 501 in FIG. 5). Note that threshold 410 is a constant for all frequencies because in FIG. 4A the signal is being input to NBI detector/estimator 204 in mode 1, wherein the input signal contains noise and NBI (such as EMI/RFI) and error in estimation of the remote signal. However, a frequency-specific threshold 420 is used as illustrated in FIG. 4B when the signal is being input to NBI detector/estimator 204 in mode 0, wherein the input signal includes the remote signal in addition to noise and EMI and error in estimation. By use of appropriate thresholds 410 and 420, the same tones 411-414 and 211-213 (FIGS. 4A and 4B) are grouped to form the group of candidate tones at the end of act 501.

Next, from among the group of candidate tones 411-414 and 211-213, a tone 211 at which a highest power occurs in vector $S[0]$-$S[M-1]$ relative to background noise is selected in act 503 and this tone 211 is designated as frequency $k_{max}$. Specifically, in some embodiments of act 503, a comparison is made based on background noise at each tone, e.g. by subtracting the power of background noise at each candidate tone k from the signal's power $S[k]$ at that candidate tone, followed by comparison of the results of subtraction. Next, in act 503, three frequencies $k_{max-1}$ and $k_{max}$ and $k_{max+1}$ are identified as a selected set of tones. Therefore, acts 501-503 of FIG. 5 together implement act 301 of FIG. 3.

In one illustrative embodiment, vector Z has three elements, which are identified based on three frequencies $k_{max-1}$ and $k_{max}$ and $k_{max+1}$ as described above and matrix G has eight columns. In this illustrative embodiment, matrix G is obtained as shown in Subsection A below (which is an integral portion of this detailed description and is incorporated by reference herein in its entirety).

In the computation shown in Subsection A, note that X is a vector with only one row which is computed by starting with the value $-1+dx$ as a first element in the row, and computing each next element in the row by adding to it the value dx, and when this is done L times the value 0 is reached, and the adding is repeated until $1-dx$ is reached, thereby to generate M elements in the row. Next, a matrix H is computed, which has the same number of columns as vector X. i.e. there are 2L columns although matrix H has three rows as follows. Each element in first row of matrix H is obtained by applying the following function $x/(1+x)$, wherein x is the corresponding value in the same column in vector X. Each element in the second row of matrix H is a constant, of value 1 (i.e. the second row is a row of 1s). Each element in third row of matrix H is obtained by applying the following function $x/(x-1)$, wherein x is the corresponding value in the same column in vector X. Thereafter, matrix G is constructed by dividing each column of matrix H by the norm of the column. The norm (also called length), is the square-root of the sum of squares of all elements in the column.

Figure 6A:
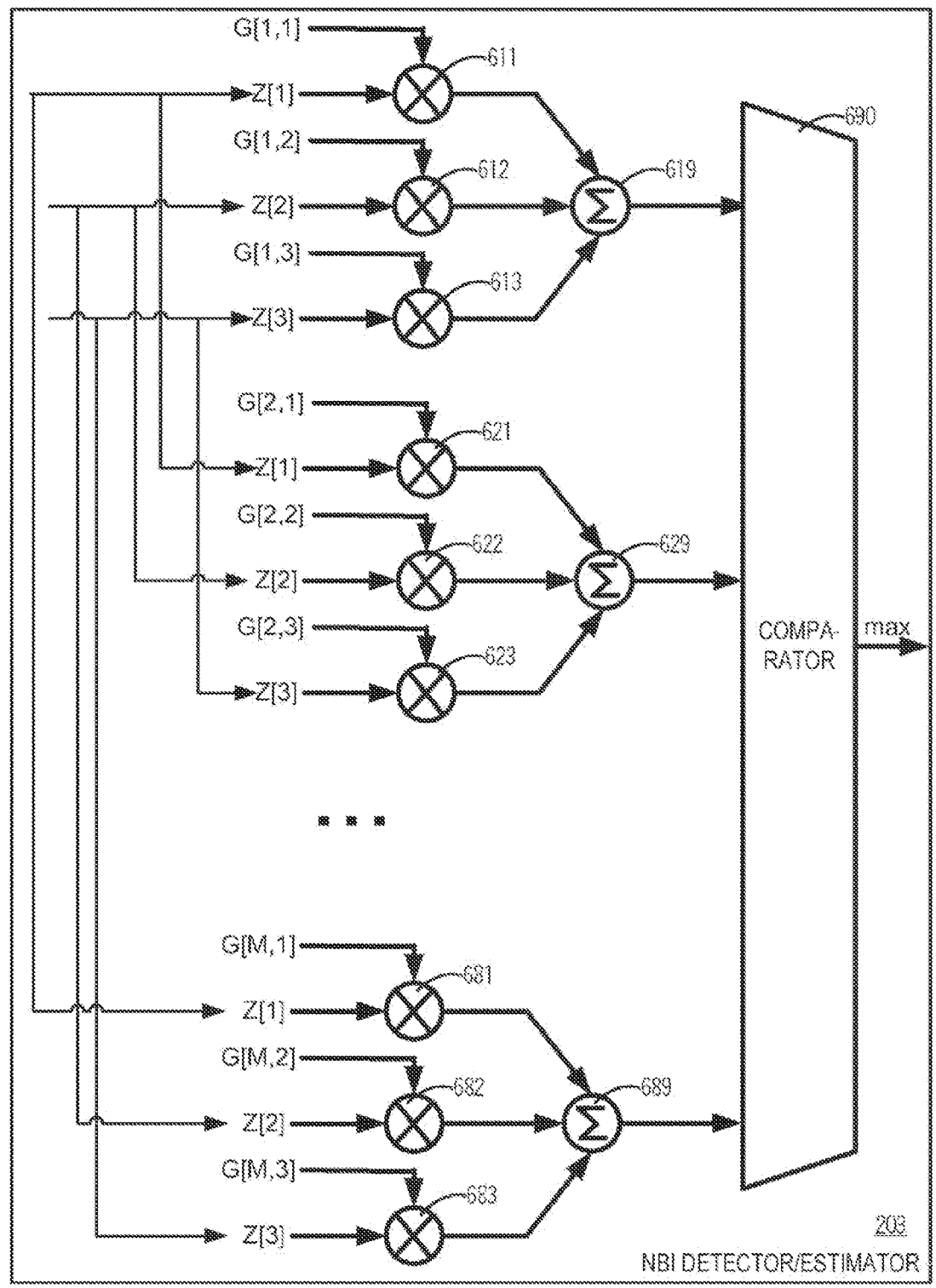
FIGS. 6A and 6B illustrate, in block diagrams, hardware used in some embodiments of the invention, to perform vector multiplication of act 223 illustrated in FIG. 3.

In some embodiments, vector multiplication of the type described above is performed by a processing unit (such as a central processing unit or CPU), or a microprocessor that is programmed with software, as would be readily apparent to the skilled artisan, although in other embodiments, the vector multiplication is performed in generic hardware (such as an arithmetic logic unit or ALU) or customized hardware (such as multipliers coupled to adders) of the type illustrated in FIG. 6A. Specifically, in one illustrative embodiment, customized hardware includes a set of multipliers 611-613 (FIG. 6A) that are hardwired to receive as inputs the respective elements of each vector and/or matrix, such as corresponding elements of vector Z namely $Z[1]$-$Z[3]$, and the first row of matrix G, namely $G[1,1]$-$G[1,3]$. The results of multiplication of set of multipliers 611-613 are fed to an adder 619 (in the customized hardware) that adds the products of multiplication and supplies its output to a comparator 690 (in the customized hardware). As shown in FIG. 6A, multiple sets of customized hardware of the type just described are included in the illustrative embodiment, such as multipliers 621-623 that are respectively coupled to the same elements of vector Z namely $Z[1]$-$Z[3]$, but to the second row of matrix G, namely $G[2,1]$-$G[2,3]$ and so on.

Figure 6B:
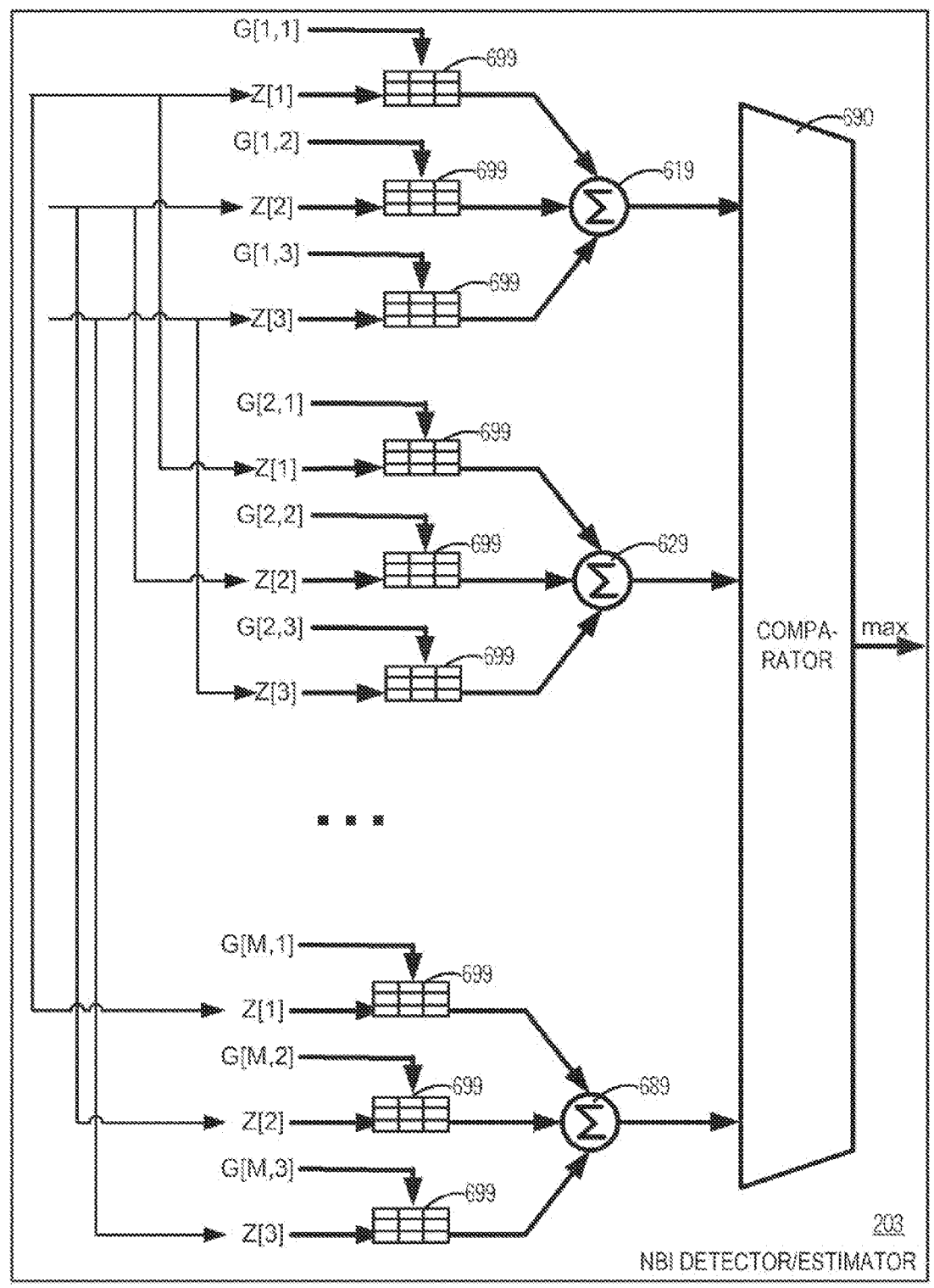

As noted above, in some embodiments, vector multiplication is implemented by a processing unit performing a table lookup, as shown in FIG. 6B. Specifically, a first embodiment selects a column and a row of a two-dimensional table 699 (FIG. 6B) using each of two multiplicands, to retrieve a single value therefrom, as a product of multiplication. Two or more such values (one value for each element in vector Z) are summed up by the processing unit to obtain a product of vector multiplication. Moreover, a second embodiment of the processing unit selects a row of a first table using a real component of a complex number in vector Z and further selects a column of the first table corresponding to the column of matrix G, to retrieve a real component of the product of vector multiplication. In the second embodiment, a second table is used by the processing unit in a similar manner, with an imaginary component of the complex number in vector Z, to retrieve an imaginary component of the product of vector multiplication. Although two examples of a table have been described, as will be readily apparent to the skilled artisan, other such tables may be used in performing vector multiplication of the type described herein.

After detection and estimation of narrowband interference by matrix multiplication as discussed above, some embodiments confirm that the NBI is not a false positive by checking for presence of and disambiguating among, one or more harmonics of a fundamental frequency as described in a related patent application, with Dariush Dabiri as the first-named inventor, that is concurrently filed herewith, and co-owned as follows:

"Confirmation of Presence of Narrowband Interference By Harmonic Analysis" Ser. No. 12/952,172.

The just-described patent application is hereby incorporated by reference herein, in its entirety.

Embodiments of the type described herein may be used to implement 10 GBASE-T PHYs of the type described in a Preliminary Product Brief document entitled "Triveni Dual/Quad Port 10 GBASE-T PHY" published July 2010 by AMCC that is incorporated by reference herein in its entirety, and available at the following address on the Internet, wherein forward slash has been replaced by "%" sign. http:%%www.appliedmicro.com%MyAMCC%retrieveDocument%MXD%TechDocs%APM9xxxx%APM96892_93_94_95%APM96892_93_94_95_Triveni_PB2162.pdf One or more circuits and/or methods described herein may be implemented and/or performed in various ways. For example, one or more features and/or circuit elements and/or method steps/acts described above and/or illustrated in FIGS. 2A, 3, 5, 6A and 6B may be implemented in hardware, firmware, software, or a combination thereof. For several implementations, one or more features and/or circuit elements and/or method steps/acts described above and/or illustrated in the just-described figures may be used and/or implemented within specific hardware, e.g. one or more application specific integrated circuits (ASICs), digital signal processors (DSPs), programmable logic devices (PLDs), field programmable gate arrays (FPGAs), processors, controllers, micro-controllers, microprocessors, electronic devices, circuits and systems designed to perform the functions described herein, or a combination thereof. For certain implementations, one or more features and/or circuit elements and/or method steps/acts described above and/or illustrated in the just-described figures may be implemented with modules (e.g., procedures, functions, and so on) that perform the functions described herein by use of software and/or firmware executing in hardware of the type just described in the previous sentence. Additionally, any non-transitory machine readable medium tangibly embodying instructions may be used in implementing one or more features and/or circuit elements and/or method steps/acts described above and/or illustrated in the above-described figures. Also, as used herein the terms "memory" and "storage element" refer to any type of long term, short term, volatile (e.g. DRAM), nonvolatile (e.g. SRAM), flip-flop, latch, or other memory that is non-transitory and accessible by any circuitry, such as a processor.

Numerous modifications and adaptations of the embodiments described herein will become apparent to the skilled artisan in view of this disclosure. For example, in an alternative embodiment, NBI detector/estimator 204 simply sorts all the M tones in descending order based on power, and then designates whichever tone is at the top of the sorted list as the frequency kmax of the strongest tone. Numerous modifications and adaptations of the embodiments described herein are encompassed by the scope of the invention.

Subsection A (of Detailed Description)
    function G
        'dx=1/L;
        X=0.5*(-1+dx:dx:1.0-dx);'
        'H=[X/(1+X); ones(size(X)); X/(X-1)];'
        'E=1/sqrt(sum($H^2$));'
        'G=H*(ones(3, 1)*E);'
    'end'

Subsection B (of Detailed Description)
Several embodiments compute $$A*\max(x,y)+B*\min(x,y)$$

as an approximation of the magnitude or absolute value of a complex number x+jy where j is the imaginary number (square root of −1). In this computation, the function max identifies whichever of x and y is larger, and the function min identifies whichever of x and y is smaller. In some embodiments A and B are constants that are predetermined, e.g. based on tradeoffs, such as error and hardware requirements. In other embodiments, A and B are variables that are looked up from a predetermined table, using (x, y) as indices into the table.

What is claimed is:

1. A method for processing an input signal, the method comprising:

selecting a first tone from a plurality of tones in a frequency domain representation of the input signal, wherein the first tone comprises a strongest tone from among the plurality of tones;

selecting a second tone from the plurality of tones, wherein the second tone is adjacent to the first tone;

selecting a first set of complex numbers from a plurality of complex numbers in the frequency domain representation that correspond to the first tone and the second tone, wherein the first set of complex numbers are a first vector;

vector multiplying the first vector with a first predefined matrix to generate a first set of products; and determining whether an interference signal is present in the input signal and determining an estimated frequency of the interference signal as defined by the first set of products.

2. The method of claim 1 further comprising selecting a third tone from the plurality of tones, wherein the third tone is adjacent to the first tone.

3. The method of claim 2, wherein the second tone is stronger than the third tone.

4. The method of claim 1, wherein the first vector comprises two or more complex numbers.

5. The method of claim 1, wherein the first vector comprises more than five complex numbers.

6. The method of claim 1, wherein a number of complex numbers in the first vector is selected depending on a desired resolution and accuracy of a curve fit.

7. The method of claim 1, wherein vector multiplying the first vector with the first matrix comprises a table lookup.

8. The method of claim 1, wherein vector multiplying the first vector with the first matrix comprises multiplying the first vector with each of a plurality of columns of the first matrix.

9. The method of claim 1, wherein determining whether an interference signal is present in the input signal comprises:
   finding a maximum value among the first set of products; and
   determining if that maximum value is greater than a predetermined threshold.

10. The method of claim 1, wherein determining an estimate of the frequency of the interference signal comprises:
    finding a maximum value among the first set of products; and
    computing a frequency of the interference signal based upon a position of this maximum value in a sequence of the first set of products.

11. The method of claim 1, wherein the first vector is a complex vector of size 1×N, wherein N is a selected integer value, wherein the first matrix is of size N×2L, and wherein L is an integer.

12. The method of claim 1 further comprising, prior to selecting the first tone and the second tone:
    applying a plurality of frequency-specific thresholds to pick a group of candidate tones from among the plurality of tones in the frequency domain representation of the input signal; and
    applying a predetermined criterion on the group of candidate tones to identify the strongest tone.

13. An apparatus for processing an input signal, the apparatus comprising:
    a signal processing unit operable to select a first tone from a plurality of tones in a frequency domain representation of the input signal, wherein the first tone is a strongest tone among the plurality of tones;
    wherein the signal processing unit is further operable to select a second tone from the plurality of tones, wherein the second tone is adjacent to the first tone;
    wherein the signal processing unit is further yet operable to:
        select a first set of complex numbers from a plurality of complex numbers in the frequency domain representation that correspond to the first tone and the second tone, wherein the first set of complex numbers are a first vector;
        vector multiply the first vector with a first predefined matrix to generate a first set of products;
        determine whether an interference signal is present in the input signal and an estimated frequency of that interference signal as defined by the first set of products.

14. The apparatus of claim 13, wherein the signal processing unit is further yet operable to select a third tone from the plurality of tones, wherein the third tone is adjacent to the first tone, and wherein the second tone is stronger than the third tone.

15. The apparatus of claim 13, wherein the first vector comprises two or more complex numbers, and wherein a number of complex numbers in the first vector is selected depending on a desired resolution and accuracy of a curve fit.

16. The apparatus of claim 13, wherein vector multiplying the first vector with the first matrix comprises one of:
    the signal processing unit performing a table lookup; and
    the signal processing unit multiplying the first vector with each of a plurality of columns of the first matrix.

17. The apparatus of claim 13, wherein determining whether an interference signal is present in the input signal comprises:
    the signal processing unit finding a maximum value among the first set of products; and
    the signal processing unit determining if that maximum value is greater than a predetermined threshold.

18. The apparatus of claim 13, wherein determining an estimate of the frequency of the interference signal comprises:
    the signal processing unit finding a maximum value among the first set of products; and
    the signal processing unit computing a frequency of the interference signal based upon a position of this maximum value in a sequence of the first set of products.

19. The apparatus of claim 13, wherein the signal processing unit is further yet operable to, prior to selecting the first tone and the second tone:
    apply a plurality of frequency-specific thresholds to pick a group of candidate tones from among the plurality of tones in the frequency domain representation of the input signal; and
    apply a predetermined criterion on the group of candidate tones to identify the strongest tone.

20. The apparatus of claim 13, wherein the signal processing unit is further yet operable to perform at least one of:
    storing the first set of products in a first memory;
    storing in the first memory a flag indicating a presence or absence of an interference signal in the input signal; and
    storing in the first memory the estimated frequency of the interference signal.

* * * * *